C. F. JOHNSON.
GREASE CUP.
APPLICATION FILED FEB. 27, 1914.

1,102,414.

Patented July 7, 1914.

Witnesses
E. R. Bartlett
Hugo W. Kreinbring

Inventor
Chester F. Johnson.
By Edward N. Pagelsen,
Attorney

UNITED STATES PATENT OFFICE.

CHESTER F. JOHNSON, OF DETROIT, MICHIGAN.

GREASE-CUP.

1,102,414.   Specification of Letters Patent.   Patented July 7, 1914.

Application filed February 27, 1914. Serial No. 821,371.

*To all whom it may concern:*

Be it known that I, CHESTER F. JOHNSON, a citizen of the United States, and a resident of Detroit, in the county of Wayne and State of Michigan, have invented a new and Improved Grease-Cup, of which the following is a specification.

This invention relates to means for supplying thick heavy lubricants to bearings, and its object is to provide a simple and cheap device having a receptacle for the lubricant which can be quickly and easily removed and be as easily put into operative position.

This invention consists in the combination of a threaded tube and a piston at one end of the same, of a nut on the tube, a receptacle for the lubricant, and means for connecting said receptacle to the nut.

Figure 1:
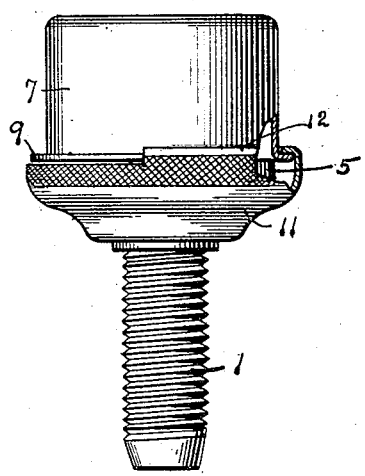
Figure 2:
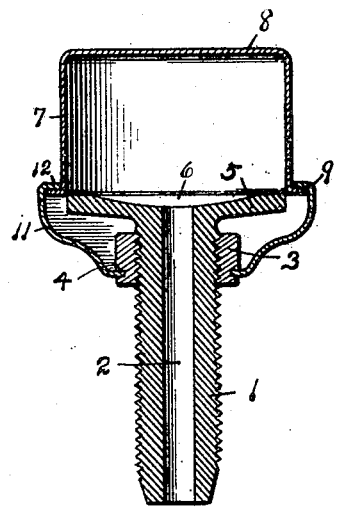
Figure 3:
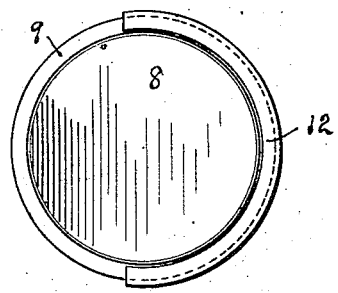
Figure 4:
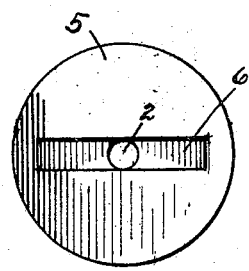

In the accompanying drawings, Figure 1 is an elevation of this improved grease cup. Fig. 2 is a central longitudinal section of this device. Fig. 3 is a plan of the grease cup. Fig. 4 is a plan of the piston.

Similar characters refer to like parts throughout the several views.

Grease cups are chiefly used to supply thick heavy lubricants to bearings and the universal form is a receptacle and a piston for forcing the lubricant through a passage to the bearing, usually through a hole in the support for the cup. The present construction differs from those of the prior art in the construction of the various parts which renders the filling of the cup much more convenient.

The stem 1, in the form of a threaded tube, has a bore 2 through which the lubricant can be forced. The end of the stem is adapted to be secured into a proper hole in the bearing. On the threaded stem is mounted a nut 3 having a circumferential groove 4, and the piston 5, preferably formed with a groove 6 to receive the bit of a screw driver by means of which the stem can be screwed down into a threaded hole in the bearing.

The receptacle for the lubricant is preferably of sheet metal in the form of a cylinder 7 having an end 8 and a flange 9. The bore of the receptacle is of about the same diameter as the piston 5 so that the piston may move longitudinally of the receptacle and force the contents of the receptacle through the bore 2, and at the same time fit the receptacle so closely that there will be no perceptible leakage between them.

The ring 11 is cup shaped and has its inner edge in the groove 4 of the nut, and has about one-half of its outer edge formed with an inturned flange 12 under which the flange 9 is adapted to slide when the parts are in the positions shown in Figs. 1 and 2. When the nut and ring 11 are moved out as far as possible, that is toward the piston, the receptacle can be slipped out laterally and filled, after which it can be replaced, after which the nut, ring and receptacle are turned to carry the nut down, away from the piston, which will pull the receptacle down over the piston. As soon as the piston enters the receptacle, the latter is prevented from sliding out, and the lubricant will be forced through the bore 2 in the usual manner.

The proportions of the various parts and their sizes may all be changed to meet various requirements without departing from the spirit of my invention set forth in the claims.

I claim:

1. In a grease cup, the combination of a hollow threaded stem and a piston at one end thereof, a nut on the stem, a ring connected to the nut, and a receptacle for the grease adapted to connect to said ring and slide over the piston as the nut is turned.

2. In a grease cup, the combination of a hollow threaded stem and a piston at one end thereof, a receptacle adapted to slide down over the piston, a nut on the stem, and means connecting the nut and receptacle, and comprising a cup shaped ring having an engagement with the nut, and having a flange in engagement with the lower edge of the receptacle.

3. In a grease cup, the combination of a hollow threaded stem and a piston at one end thereof, a cylindrical receptacle adapted to slide over said piston and having a radial flange at its lower edge, a nut on the stem, and a cup shaped ring connected to the nut and formed with an inturned flange around a portion of its outer edge to engage the flange on the receptacle.

In testimony whereof, I sign this specification in the presence of two witnesses.

CHESTER F. JOHNSON.

Witnesses:
EDWARD N. PAGELSEN,
L. M. SPENCER.

---

Copies of this patent may be obtained for five cents each, by addressing the "Commissioner of Patents, Washington, D. C."